Patented July 23, 1935

2,009,058

UNITED STATES PATENT OFFICE 2,009,058

WATER-INSOLUBLE AZO-DYESTUFF AND FIBER DYED THEREWITH

Arthur Zitscher, Offenbach-on-the-Main, Germany, assignor to General Aniline Works, Inc., New York, N. Y., a corporation of Delaware No Drawing. Application June 22, 1933, Serial No. 677,169. In Germany June 25, 1932

10 Claims. (Cl. 260—76)

The present invention relates to water-insoluble azo-dyestuffs and to fiber dyed therewith, more particularly it relates to compounds of the following general formula:

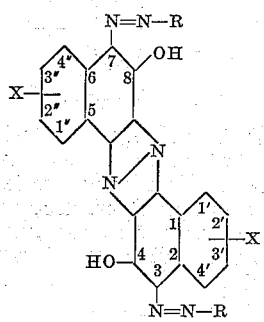

wherein X stands for hydrogen or halogen and R means a radical of the benzene, naphthalene, anthraquinone or carbazole series.

I have found that valuable water-insoluble azo-dyestuffs are obtainable by combining diazo compounds with 4,8-dihydroxy-1,2,5,6-dibenzo-phenazines of the following formula:

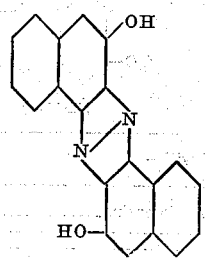

which may be substituted in the benzene nuclei not containing the hydroxy groups, either in substance, on the fiber or on any of the usual substrata adapted for the production of lakes, only such components being used which do not contain any group lending solubility, such as the sulfonic acid or carboxylic acid group.

In this manner there are obtained deep red-brown to black dyeings according to the kind of the diazo compounds from mono-amines, amino-azo-compounds or poly-amines.

The new dyestuffs may be used for the preparation of fast dyeings and printings on the fiber or for the preparation of pigments.

The 4,8-dihydroxy-1,2,5,6-dibenzo-phenazines are obtainable by converting a 2-amino-3-hydroxy-naphthalene, the hydrogen atom of the hydroxy group of which being replaced by a suitable radical as, for instance, by acyl or alkyl radicals, into the phenazine according to known methods and then splitting off the radicals linked to the hydroxy groups. They have, in contradistinction to beta-naphthol, a certain affinity for the fiber which allows to produce the dyestuffs on the fiber without an intermediate drying of the grounded goods. The dyeings, thus obtained, possess a better fastness to soaping than those prepared by means of comparable combinations from beta-naphthol.

The following examples serve to illustrate the invention, but they are not intended to limit it thereto, the parts being by weight, unless otherwise stated:

(1) 12.75 parts of 1-amino-3-chlorobenzene are diazotized in the usual manner and the diazo solution is coupled with a solution of 32.5 parts of 4,8-dihydroxy-1,2,5,6-dibenzophenazine in dilute caustic soda solution to which there have been added the quantity of sodium acetate necessary for binding the excess of mineral acid and 5 parts of Turkey red oil. The dyestuff of the following probable formula:

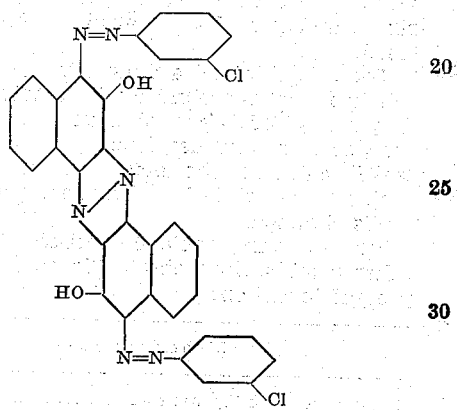

which has been precipitated, is filtered by suction and washed well. For the preparation of pigments it is advantageously used in the form of a paste and, when mixed with substrata, it yields a dark brown lake.

(2) Well boiled and dried cotton yarn is impregnated with a solution which contains per liter 5 grams of 4,8-dihydroxy-1,2,5,6-dibenzo-phenazine,
10 cc. of caustic soda solution of 34° Bé.,
10 cc. of Turkey red oil and
50 grams of sodium chloride, thereupon, the yarn is squeezed well and developed in a diazo-solution which contains per liter the diazo compound from 1.68 grams of 1-amino-2-methoxy-4-nitrobenzene and has been neutralized by means of sodium acetate; the yarn is then rinsed and soaped.

There is obtained a deep black-brown dyeing.

(3) Viscose artificial silk is impregnated with a solution which contains per liter 5 grams of 4,8-dihydroxy-1,2,5,6-dibenzo-phenazine,
15 cc. of caustic soda solution of 34° Bé.,
10 cc. of Turkey red oil and
20 grams of sodium chloride, thereupon, it is well freed from water and developed in a diazo-solution which contains per liter the diazo-compound from 3 grams of 1-amino-4-benzoylamino-2,5-diethoxy-benzene and has been neutralized by means of sodium acetate; the silk is rinsed, first with cold water and then with hot water, and soaped at 60° C. for a short time.

There is obtained a dark green dyeing.

(4) Spun silk is grounded at 20° C. to 25° C. for 15 to 20 minutes in the proportion of the goods to the liquor 1:30 with a solution which contains per liter 5 grams of 4,8-dihydroxy-1,2,5,6-dibenzo-phenazine,
15 cc. of caustic soda solution of 34° Bé. and
10 cc. of Turkey red oil, thereupon, 25 grams of sodium chloride per liter are added and the whole is again handled for 15 to 20 minutes. After squeezing, the dyestuff is developed in the course of 30 minutes in a diazo-solution which contains per liter the diazo-compound from 1.6 grams of 1-amino-2-methoxy-4-chlorobenzene and has been neutralized by means of sodium acetate and to which 20 grams of sodium chloride per liter have been added. The dyeing is then rinsed in cold water and acidified with a solution of 3 cc. of concentrated hydrochloric acid per liter, while lukewarm, then it is rinsed again, treated with hot sodium carbonate solution (3 grams of calcined sodium carbonate per liter), rinsed and soaped twice at 75° C. to 80° C. and dried.

There is obtained a dark olive dyeing.

When wool is grounded with a solution of 4,8-dihydroxy-1,2,5,6-dibenzo-phenazine in caustic soda solution and developed in a diazo-solution which contains the diazo-compound from 1-amino-2-methyl-4-chlorobenzene, a brown dyeing is obtained.

The following table comprises a number of other combinations obtainable according to the present invention:

| | Diazo compound of— | Combined with— | Shade |
|---|---|---|---|
| 1 | 1-amino-2,4-dimethyl-benzene | 4,8-dihydroxy-1,2,5,6-dibenzo-phenazine | Olive-black. |
| 2 | 1-amino-2-methyl-5-chlorobenzene | do | Black-brown. |
| 3 | 1-amino-2-phenoxy-5-chlorobenzene | do | Dark-red-brown. |
| 4 | 1-amino-4-benzoylamino-5-methoxy-2-chlorobenzene | do | Brownish-black. |
| 5 | 1-amino-4-benzoylamino-2,5-diethoxy-benzene | do | Blackish-green. |
| 6 | 1-amino-2-nitrobenzene | do | Red-brown. |
| 7 | 1-amino-anthraquinone | do | Do. |
| 8 | 4-amino-4'-methoxy-diphenylamine | do | Olive-black. |
| 9 | 4-amino-3,2'-dimethyl-azo-benzene | do | Do. |
| 10 | 4-amino-2,5-dimethoxy-4'-nitro-azo-benzene | do | Green-black. |
| 11 | 1-amino-2-methyl-4-chlorobenzene | do | Black-brown. |
| 12 | 1-amino-2-chloro-5-trifluormethylbenzene | do | Red-brown. |
| 13 | 3-amino-carbazole | do | Dark olive. |
| 14 | 3-amino-benzophenone | do | Dark brown. |
| 15 | 1-amino-2,4,5-trichlorobenzene | do | Brown. |
| 16 | 1-amino-2-(2',5'-dichlorophenoxy)-5-chlorobenzene | do | Black-brown. |
| 17 | 1-amino-2-methylbenzene-5-(carbonyl-1-amino-2,5-dimethoxybenzene). | do | Do. |
| 18 | 1-amino-4-benzoyl-amino-2,5-dichlorobenzene | do | Do. |
| 19 | 1-amino-1,6-dibromonaphthalene | do | Do. |
| 20 | 2-amino-3-methyl-2,4-dichlorobenzene | do | Dark brown. |
| 21 | 4,4'-diamino-3,3'-dichloro-diphenyl | do | Black-olive. |
| 22 | 1-amino-2-chlorobenzene | 4,8-dihydroxy-Bz-2',2''-dibromo-1,2,5,6-dibenzo-phenazine. | Black-olive-brown. |
| 23 | 1-amino-2,5-dichlorobenzene | do | Dark brown. |
| 24 | 1-amino-2-methyl-5-chlorobenzene | do | Dark olive. |
| 25 | 1-amino-2-methyl-3-chlorobenzene | do | Do. |
| 26 | 1-amino-2-methoxy-5-chlorobenzene | do | Do. |
| 27 | 1-amino-2-(4'-chlorophenoxy)-5-chlorobenzene | do | Do. |
| 28 | 1-amino-2-methoxy-5-(diethyl-amino-sulfonyl)-benzene | do | Olive. |
| 29 | 1-amino-2-phenyl-sulfonyl-benzene | do | Red-brown. |
| 30 | 1-amino-2-methyl-4-nitrobenzene | do | Black-olive. |
| 31 | 1-amino-2-methoxy-5-nitrobenzene | do | Brown-olive. |

Since an object of the present invention is to provide dyestuffs of good fastness properties, which dyestuffs are insoluble in water and alkalies, it is to be understood that the aromatic nuclei of the general formulæ appearing in the appended claims do not contain any substituents which are known to render organic compounds soluble in water or alkalies and to tend to depreciate the fastness of the dyestuffs to alkalies. Substituents of this kind are, for instance, the sulfonic acid and the carboxylic acid group.

I claim:

1. The water-insoluble azo-dyestuffs of the general formula:

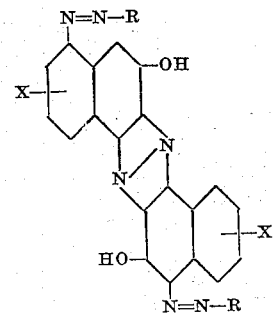

wherein X stands for hydrogen or halogen and R means a radical of the benzene, naphthalene, anthraquinone or carbazole series, yielding, when produced on the fiber, deep red-brown to black dyeings of good fastness properties.

2. The water-insoluble azo-dyestuffs of the general formula:

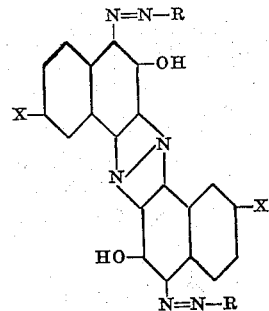

wherein X stands for hydrogen or bromine and R means a radical of the benzene series, yielding, when produced on the fiber, deep red-brown to black dyeings of good fastness properties.

3. The water-insoluble azo-dyestuff of the formula:

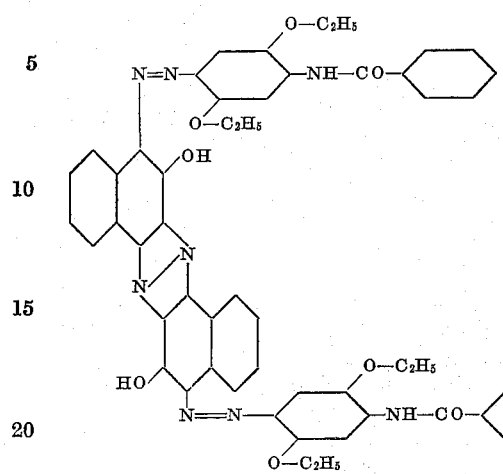

yielding, when produced on the fiber, a blackish-green dyeing.

4. The water-insoluble azo-dyestuff of the formula:

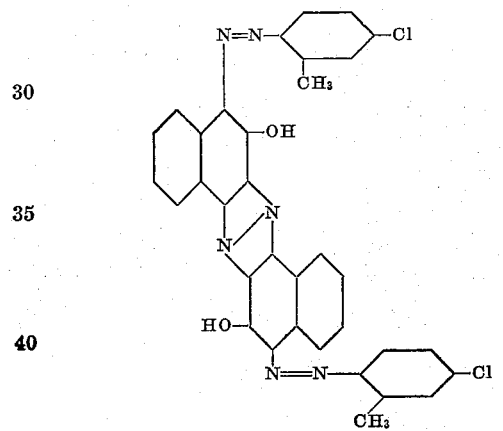

yielding, when produced on the fiber, a black-brown dyeing.

5. The water-insoluble azo-dyestuff of the formula:

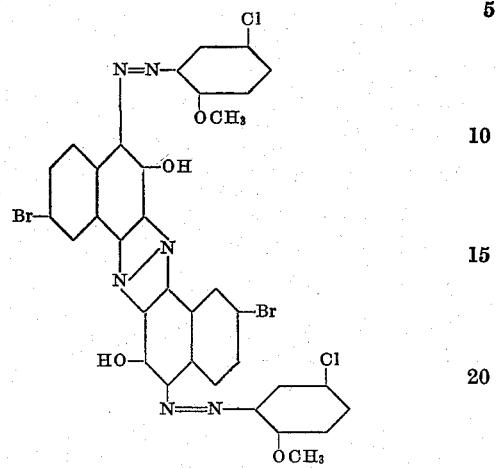

yielding, when produced on the fiber, a dark olive dyeing.

6. Fiber dyed with the azo-dyestuffs as claimed in claim 1.
7. Fiber dyed with the azo-dyestuffs as claimed in claim 2.
8. Fiber dyed with the azo-dyestuff as claimed in claim 3.
9. Fiber dyed with the azo-dyestuff as claimed in claim 4.
10. Fiber dyed with the azo-dyestuff as claimed in claim 5.

ARTHUR ZITSCHER.